United States Patent Office 3,222,309
Patented Dec. 7, 1965

3,222,309
INTERPOLYMERS OF ALDEHYDE MODIFIED AMIDES AND FATTY ACID ESTERS OF EPOXIDIZED POLYDIOLEFINS
Kazys Sekmakas, Chicago, Ill., assignor to De Soto Chemical Coatings, Inc., Chicago, Ill., a corporation of Delaware
No Drawing. Filed Apr. 11, 1963, Ser. No. 272,223
13 Claims. (Cl. 260—23.7)

The present application is a continuation-in-part of my prior application Serial No. 217,263, filed August 16, 1962.

The present invention relates to aldehyde-modified acrylamide interpolymers containing interpolymerized ethylenically unsaturated epoxy resins and especially fatty acid esters thereof providing heat-curing products which cure to form hard, flexible, solvent resistant coatings exhibiting high gloss and adhesion to the underlying substrate. The new copolymers or interpolymers in accordance with the invention are especially useful in organic solvent solution coating compositions.

The utilization of epoxy resins which have been esterified with fatty acids, and especially with drying oil fatty acids, including fatty acids from semi-drying oils, is an important feature of the present invention because the use of the fatty acid-epoxy ester confers a significant improvement in flexibility, especially as is established by forward and reverse impact testing, and the improved flexibility is achieved without significant loss of film hardness or other desired film properties.

Etherified alkylolated acrylamide-containing interpolymers have previously been used in organic solvent solution coating compositions. Unfortunately, when the interpolymer is the sole film-forming component of the coating, it has not been possible to obtain a fully satisfactory combination of properties. Among the difficulties experienced is inadequate adhesion to the substrate which is coated, e.g., a metal substrate. To overcome this difficulty, the art has employed cold blends with epoxy resins, but this is not entirely satisfactory. A further difficulty is unduly limited compatibility with alkyd resins, vinyl resins and aminoplast resins, e.g., solvent-soluble heat hardening condensation products of urea or melamine with excess formaldehyde.

In accordance with the invention, an amide of an ethylenically unsaturated carboxylic acid, preferably an acrylamide, is copolymerized with an ethylenically unsaturated epoxy resin and especially fatty acid esters thereof, the interpolymer preferably including other polymerizable ethylenically unsaturated materials, especially monomers containing the $CH_2{=}C{<}$ group to produce a non-gelled, solvent-soluble copolymer or interpolymer.

When the interpolymer or one of the monomer components thereof includes amido hydrogen atoms, these are at least partially replaced by reaction with an aldehyde and the hydroxy groups generated in this manner may be etherified in whole or in part, but preferably in minor amount or not at all. Any aliphatic alcohol, including polyhydric alcohols such as glycols, may be used for etherification.

As a result, the interpolymer desirably includes amido hydrogen atoms replaced by the structure:

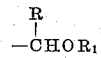

wherein R is selected from the group consisting of hydrogen, furyl, and aromatic and saturated lower aliphatic hydrocarbon radicals containing up to 10 carbon atoms, and $R_1$ is selected from the group consisting of hydrogen, and the etherification residue of aliphatic alcohol containing up to 10 carbon atoms. Preferably, R is hydrogen.

As will be more fully appreciated hereinafter, considerable variation is permissible in the kind and ratio of ethylenically unsaturated materials which are used, the aldehyde modifying agent, the etherifying agent and the extent of etherification. Moreover, there is also a considerable variation which can be made in the specific nature of the ethylenically unsaturated epoxy resin and the fatty acid ester thereof.

While it is preferred to employ acrylamide in proportions of from 2 to 45%, preferably from 5 to 30% by weight, with unsaturated monomers containing the $CH_2{=}C{<}$ group, the invention is not limited to acrylamide or to the presence of a terminal methylene group. Thus, other acrylamide monomers such as methacrylamide and itaconate diamide may be used. Indeed, amides of other unsaturated acids such as maleic acid diamide, fumaric acid diamide, sorbic acid amide and nuconic acid diamide may less desirably be used. While it is preferred to use interpolymerized acrylamide with unsaturated monomers containing a single $CH_2{=}C{<}$ group and while it is further preferred to use combinations of monomers which form hard polymers such as styrene, vinyl toludene and methacrylate, and monomers which form soft polymers such as monoethylenically unsaturated carboxylic acid esters having a terminal aliphatic hydrocarbon group containing from 2–20 carbon atoms, illustrated by ethyl acrylate, butyl acrylate, 2-ethylhexyl acrylate, and stearyl acrylate, the invention is not restricted to the selection of monomers containing the $CH_2{=}C{<}$ group or to the selection of preferred combinations of monomers. Thus, monomers which do not contain the $CH_2{=}C{<}$ group may be interpolymerized with acrylamide either alone or in the presence of monomers which do contain the $CH_2{=}C{<}$ group. Particular attention is directed to maleic acid or anhydride, maleic acid monoesters and diesters, butene-2 and fatty acids containing conjugated unsaturation such as dehydrated caster oil fatty acids which are useful in the production of interpolymers with acrylamide. Still other monomers which may be used are acrylic acid, methacrylic acid, 1,3-butadiene, vinyl ethers such as n-butyl vinyl ether, glycidyl methacrylate, etc.

Non-monomeric ethylenically unsaturated materials may also be used as is illustrated in my copending application Serial No. 115,330, filed June 7, 1961, now United States Patent No. 3,163,615, the disclosure of which is hereby incorporated by reference.

Stated briefly, one may incorporate 5% or more to the total exclusion of vinyl monomers other than arcylamide of unsaturated polyester resin. Preferred polyesters are those in which the unsaturation in the polyester is substantially confined to side chains in the polyester structure as by the use of a monoethylenically unsaturated monofunctional component such as crotonic acid or allyl alcohol or in which a cyclopentadiene such as dicyclopentadiene is adducted with an unsaturated dicarboxylic acid such as maleic acid or anhydride or fumaric acid.

The ethylenically unsaturated epoxy resins which are used in accordance with the invention are epoxidized polyolefins containing extensive ethylenic unsaturation as is produced by the polymerization of a polyunsaturated olefin such as butadiene or isoprene either alone or in admixture or together with minor proportions of monoethylenically unsaturated monomers such as butene-1, ethylene, propylene, styrene, vinyl toluene, etc. The polydiolefin is a liquid polymer and is subjected to epoxidation as with peracetic acid to partially convert the olefinic unsaturation in the polymer to oxirane groups, some of which are internal, e.g., positioned along the essentially linear polymer chain, and others of which are terminal, e.g., positioned at the termination of branches formed by the incorporation of polydiolefin such as butadiene into the polymer chain through one of its double bonds, leaving the other double bond extending away from the polymer chain. The epoxidation process is not carried to completion, leaving substantial unsaturation to permit further addition polymerization. Also, the epoxidation process may provide some hydroxyl functionality.

Preferred ethylenically unsaturated epoxy resins are liquid at room temperature, have an iodine number of at least 100 and have an epoxide equivalent weight in the range of from 100–300 (grams of resin containing 1 gram mole of epoxide). A particularly preferred ethylenically unsaturated epoxy resin referred to hereinafter as unsaturated epoxy resin A, is a viscous liquid partially epoxidized polybutadiene having a viscosity of 1800 poises at 25° C., an epoxide equivalent weight of 177, 2.5% by weight of hydroxyl and an iodine number of 185.

It is preferred to employ esterified ethylenically unsaturated epoxy resins, these being the esterification product of the ethylenically unsaturated epoxy resins disclosed hereinbefore with fatty acids. Any fatty acids, either saturated or unsaturated, may be used in the esterification of the unsaturated epoxy resin, but, preferably, the fatty acids are of the long chain variety containing 16–22 carbon atoms in the molecule. The preferred fatty acids are of the unsaturated type illustrated by drying oil fatty acids, including fatty acids derived from semi-drying oils and frosting oils. Appropriate fatty acids are illustrated by tall oil fatty acids, linseed oil fatty acids, safflower oil fatty acids, dehydrated castor oil fatty acids, etc. Saturated fatty acids may less desirably be employed and these are illustrated by coconut oil fatty acids.

The improvement in flexibility of the interpolymer is noticeable when 5 percent or more of the total esterifiable groups are esterified, the improvement including esterification up to 100 percent. It is preferred to limit esterification so that the hydroxy side chains are substantially unaffected, this being feasible because the reaction of fatty acid with the epoxy group proceeds preferentially to the reaction of fatty acid with the hydroxyl group, including the secondary hydroxyl group generated by ester formation.

Thus, and in preferred practice, esterification is essentially limited to the esterification of the oxirane group employing an equivalent ratio of fatty acid carboxyl group to epoxy oxirane group of 0.2:1 to 1:1, preferably 0.3:1 to 0.8:1.

The ethylenically unsaturated epoxy resin and especially the fatty acid ester thereof in accordance with the invention is desirably employed in an amount of from 2–50% by weight, based on the total weight of polymerizable material. Preferred proportions, on the same basis, are from 3–25% by weight, most preferably from 4–15%.

With respect to interpolymer production, it is possible, as disclosed in my prior application Serial No. 100,804, filed April 5, 1961, now United States Patent No. 3,163,623, the disclosure of which is hereby incorporated by reference, to carry out the addition polymerization reaction at the same time that the aldehyde component is reacted with amido hydrogen atoms. In other words, polymerization and aklylolation may advantageously be accomplished at the same time and in a single stage. A basic catalyst may be used as taught in said prior application. Also, and in the absence of any significant proportion of vinyl monomer other than acrylamide, and especially when the acrylamide component is used in small amount, the single stage polymerization and alkylolation may be carried out without gelation in the absence of a basic catalyst.

Any free-radical generating polymerization catalyst may be used for the solution copolymerization in accordance with the invention, the selection of catalyst being determined by the desired temperature of the polymerization reaction. The important point is that the agent liberate free radicals under the conditions of polymerization so that the addition polymerization is facilitated. The class of free-radical generating polymerization catalysts is too well known to require elucidation except to point out that typical catalysts are illustrated in the examples.

The aldehyde modifying agent is desirably used in an amount of from 0.2–5 equivalents of aldehyde, and preferably in an amount of from 1–4 equivalents of aldehyde for each amide group used in the formation of the acrylamide interpolymer. The preferred aldehyde is formaldehyde. Other monoaldehydes, including acetaldehyde, propionaldehyde, butyraldehyde, benzaldehyde, and furfural, or substances yielding an aldehyde, such as paraformaldehyde, hexamethylene tetramine or trioxymethylene can also be used.

Etherification of the aldehyde-modified amide interpolymer is not essential. Lower alcohols containing up to 10 carbon atoms, especially butanol and ethoxy and butoxy ethanol are preferred for etherification and the etherification reaction may be carried out up to 100% of the alkylol radical present in the interpolymer although little or no etherification is preferred. When less than 100% etherification is effected, as is preferred, the product is a mixture in which the amido hydrogen atoms in some of the acrylamide interpolymer molecules are replaced by the structure —ROH, and the amido hydrogen atoms in other of the acrylamide interpolymer molecules are replaced by the structure —ROR$_1$, R representing a hydrocarbon radical introduced by the aldehyde modifying agent and R$_1$ is the residue of the alcohol produced by the etherification reaction. When the etherifying alcohol is a glycol, the group R$_1$ is hydroxy-terminated, but this is permissible in the invention in which the presence or absence of etherification is a mere matter of choice.

While the interpolymers of the prevent invention are importantly useful alone in organic solvent solution coating compositions, they also exhibit excellent compatibility with other film-forming resinous materials and are desirably applied in admixture therewith, the term "admixture" including partial pre-reaction between the respective components which are blended together. In this regard, excellent compatibility is exhibited with heat-hardening, solvent-soluble polymethylol compounds including urea-formaldehyde condensates and melamine-formaldehyde condensates as well as aldehyde condensates with other triazines, such as benzoguanamine, all of the foregoing falling generally within the heading of aminoplast resins. Good compatibility with other film-forming resins extends to alkyd resins, epoxy resins and vinyl resins. Also, the resinous materials may be employed alone, or in combination with one another.

Of especial note in connection with the present invention and as features thereof, excellent compatibility exists with hexamethylol melamine and hydroxy-containing addition copolymers illustrated particularly by copolymers of vinyl chloride and vinyl acetate, which have been partially hydrolyzed or saponified to convert a portion of the acetate groups to hydroxyl groups. The hydroxyl group provided in the addition copolymer referred to and in the hexamethylol melamine is highly reactive with the amino alkylol group of the acrylamide interpolymer and also with any residual hydroxyl groups provided by the unsaturated epoxy resin, including the ester thereof, to provide a rapid cure at elevated temperature producing insoluble coatings characterized by unusual flexibility coupled with significant hardness, properties which are normally antagonistic with respect to one another. Preferred copolymers contain from 80–92% by weight of vinyl chloride, with the balance of the copolymer being essentially vinyl acetate, and with a portion of the vinyl acetate converted to vinyl alcohol to provide a vinyl alcohol content of from 2–10% by weight, preferably from 3–8% by weight.

In the provision of blends in accordance with the invention, the proportions of the resinous materials which are blended may vary over the weight range of from 5:95 to 95:5. Preferably, the acrylamide interpolymer is used in proportions of from 20–90%, based on the weight of the mixture of resinous materials, and most preferably the acrylamide interpolymer is present in a major proportion of from 50–90%, based on the total weight of resinous material, especially when the acrylamide content of the interpolymer is in the range of from 2–20%, based on the weight of the interpolymer.

The particular nature of the organic solvent used for the solution copolymerization or for the solvent solution application of the interpolymers is not a critical aspect of the invention. Butanol, preferably in admixture with xylol, is a preferred solvent system, but the invention is not limited to specific solvents since many others are available and useful, such as toluene, methyl ethyl ketone, methyl isobutyl ketone, acetone, butyl acetate, 2-ethoxy ethanol, 2-butoxy ethanol, etc.

It will be understood that the invention is illustrated, but not limited by the specific examples presented hereinafter. It will also be evident that the products of the invention, while useful in diverse types of heat-hardening resinous compositions are primarily useful in the coating art, in which event they are applied either alone or in combination with the other resinous materials listed hereinbefore, from a compatible organic solvent solution. These coating solutions may be pigmented or contain dyes, flow control agents, waxes and various other components as will be evident to those skilled in the art.

In the examples which follow, all parts are by weight, unless otherwise indicated.

EXAMPLE I

Interpolymer consisting of 10% unsaturated epoxy resin, 45% styrene, 15% acrylamide and 30% ethyl acrylate.

*Charge composition (parts by weight)*

| | Grams |
|---|---|
| Xylol | 200 |
| Methyl isobutyl ketone | 100 |
| n-Butanol | 100 |
| 2-butoxy ethanol | 100 |
| Paraformaldehyde | 100 |
| Acrylamide | 150 |
| n-Butanol | 500 |
| Styrene | 450 |
| Ethyl acrylate | 300 |
| Unsaturated epoxy resin A | 100 |
| Triethyl amine | 3 |
| Tertiary dodecyl mercaptan | 24 |
| Azobisbutyronitrile | 5 |
| Di-tertiary-butyl peroxide | 5 |
| Cumene-hydroperoxide | 5 |
| Isopropanol | 90 |

*Procedure of polymerization*

Charge 200 grams xylol, 100 grams methyl isobutyl ketone, 100 grams paraformaldehyde, 100 grams n-butanol and 100 grams 2-butoxy ethanol into a reactor equipped with an agitator, condenser, thermometer and nitrogen inlet.

The initial charge is heated to reflux temperature (235–240° F.). Then 150 grams acrylamide are dissolved in 500 grams of n-butanol and this solution is premixed with the other monomers to provide a monomer blend.

To this monomer blend are added 5 grams di-tertiary-butyl peroxide, 5 grams azobisbutyronitrile, 3 grams triethyl amine and 24 grams tertiary dodecyl mercaptan. Dodecyl mercaptan is a chain terminating agent.

The above monomer blend, including catalyst and amine are added to the reactor over a 2½ hour period of time, and the mixture is maintained at 245–255° F.

After the monomer addition is finished, the contents of the reactor are kept at reflux temperature (230–240° F.) for 8½ hours for conversion of monomer to interpolymer. No water is removed from the reaction mixture. The solution interpolymer product is thinned with isopropyl alcohol to 49–50% solids and filtered.

The resulting solution of interpolymer has the following physical characteristics:

| | |
|---|---|
| Solids (percent) | 49.1 |
| Viscosity (Gardner-Holdt) | V |
| Color (Gardner-Holdt) | 2 |

EXAMPLE 2

An interpolymer is prepared containing 5% unsaturated epoxy resin using the same procedure as in Example 1.

*Charge composition (parts by weight)*

| | Grams |
|---|---|
| Xylol | 200 |
| Paraformaldehyde | 100 |
| Methyl isobutyl ketone | 100 |
| n-Butanol | 100 |
| 2-butoxy ethanol | 100 |
| Acrylamide | 150 |
| n-Butanol | 500 |
| Styrene | 440 |
| Ethyl acrylate | 260 |
| Unsaturated epoxy resin A | 50 |
| Triethyl amine | 3 |
| Di-tertiary-butyl peroxide | 5 |
| Azobisbutyronitrile | 5 |
| Tertiary dodecyl mercaptan | 24 |

The resulting solution of interpolymer has the following physical characteristics:

| | |
|---|---|
| Solids (percent) | 48.1 |
| Viscosity (Gardner-Holdt) | U |
| Color (Gardner-Holdt) | 1–2 |

The resins of Examples 1 and 2 are utilized in enamel formulations containing 28% titanium dioxide and 32% non-volatile resin. The pigmented resin solutions are ground in a pebble mill to obtain a 7½ North Standard grind gauge reading.

The cure characteristics of the enamels are checked using 0.5% by weight of phosphoric acid as catalyst (based on resin solids).

The enamels are drawn on bare steel panels and baked for twenty minutes at 325° F. The following results are obtained:

| | Example 1 | Example 2 |
|---|---|---|
| Ahdesion to metal | Excellent | Excellent. |
| Pencil hardness | 3 H+ | 3 H. |
| Forward impact | Pass 20 in./lbs. | Pass 20 in./lbs. |
| Flexibility (Conical Mandrel) | Pass ⅛" | Pass ⅛". |
| Gloss | Very Good | Very Good. |
| Toluol resistance | Excellent | Excellent. |
| Recoat adhesion | do | Do. |

EXAMPLE 3

Using the same procedure as in Example 1, an interpolymer is prepared consisting of 10% unsaturated epoxy resin, 10% acrylamide, 25% styrene, 5% methyl methacrylate, 40% ethyl acrylate, and 10% 2-ethyl hexyl acrylate.

*Charge composition (parts by weight)*

| | Grams |
|---|---|
| Mixture of aromatic hydrocarbon solvents (see Note 1) | 300 |
| n-Butanol | 100 |
| 2-butoxy ethanol | 100 |
| Paraformaldehyde | 100 |
| Acrylamide | 100 |
| 2-ethyl hexyl acrylate | 100 |
| n-Butanol | 300 |
| 2-butoxy ethanol | 100 |
| Styrene | 250 |
| Methyl methacrylate | 50 |
| Ethyl acrylate | 400 |
| Unsaturated epoxy resin A | 100 |
| Triethyl amine | 3 |
| Di-tertiary-butyl peroxide | 6 |
| Azobisbutyronitrile | 6 |
| Benzoyl peroxide | 2 |
| Tertiary dodecyl mercaptan | 25 |

The resulting solution of interpolymer has the following physical characteristics:

| | |
|---|---|
| Solids (percent) | 51.4 |
| Viscosity (Gardner-Holdt) | U |
| Color (Gardner-Holdt) | 1–2 |

The interpolymer of the present example is evaluated as a white enamel containing 28% titanium dioxide and 32% non-volatile resin. The enamel is applied on aluminum using #40 wound wire rod draw downs and the coating is baked for 90 seconds at 475° F. The resulting coating has excellent gloss and appearance. Flexibility is very good and adhesion to metal is outstanding.

*Note 1.*—A mixture of aromatic hydrocarbon solvents having the following typical physical data:

| | |
|---|---|
| Specific gravity at 60/60° F. | 0.8749 |
| Flash, ° F. (tag closed cup) min. | 100 |
| Distillation ASTM (D268): | |
|    Initial boiling point, ° F. | 306 |
|    10% | 311 |
|    50% | 317 |
|    90% | 327 |
|    Dry point, ° F. | 343 |
| Viscosity, cp., at 25° C. | 0.797 |
| KB value (toluol=105) | 90 |
| KB value (after 75% is evaporated) | 98 |
| Mixed aniline point, ° C. | 12.0 |
| Percent aromatics | 99.5 |

EXAMPLES 4 AND 5

Acrylamide interpolymers containing an unsaturated epoxy ester are prepared as follows:

| Example | | Interpolymer Monomer Composition |
|---|---|---|
| 4 | 5 | |
| 80 | 100 | Acrylamide. |
| 290 | 250 | Styrene. |
| 250 | 300 | Ethyl acrylate. |
| --- | 100 | Butyl acrylate. |
| 100 | --- | 2 ethyl hexyl acrylate. |
| 56 | 50 | Unsaturated epoxy ester (Note 2). |
| 60 | 50 | Methyl methacrylate. |
| 200 | 200 | Unsaturated polyester (Note 3). |

| Example | | Charge Composition |
|---|---|---|
| 4 | 5 | |
| 300 | 300 | Mixture of aromatic hydrocarbon solvents (Note 1). |
| 85 | 85 | n-Butanol. |
| 80 | 80 | Paraformaldehyde. |
| 215 | 215 | 2 butoxy ethanol. |
| 80 | 100 | Acrylamide. |
| 205 | 205 | n-Butanol. |
| 290 | 250 | Styrene. |
| 250 | 300 | Ethyl acrylate. |
| 70 | 70 | Unsaturated epxoy ester (Note 2). |
| --- | 100 | Butyl acrylate. |
| 100 | --- | 2-ethyl hexyl acrylate. |
| 60 | 50 | Methyl methacrylate. |
| 250 | 250 | Unsaturated polyester resin (Note 3). |
| --- | 6 | Glacial methacrylic acid. |
| 3 | 3 | Triethyl amine. |
| 6 | 6 | Azobisbutyronitile. |
| 6 | 6 | Di-tert-butyl peroxide. |
| 2 | 2 | Benzoyl peroxide. |
| 5 | 6 | Cumene hydroperoxide. |
| 14 | 18 | Tertiary dodecyl mercaptan. |

*Procedure of polymerization*

Charge into a reactor equipped with an agitator, a reflux condenser, thermometer and nitrogen inlet tube the 300 parts of aromatic hydrocarbon solvent mixture, the 85 parts of n-butanol and the 80 parts of paraformaldehyde and heat to 250° F.

250° F. over a 2½ hour period. Heat the reaction mixture for four hours and add 3 parts of cumene hydroperoxide.

In a separate container dissolve the acrylamide in the 2-butoxy ethanol and the 205 parts of n-butanol, and add the remaining monomers and catalysts (except for cumene hydroperoxide). Add the mixture to the reactor at 245–250° F. Continue heating the reaction mixture for an additional two hours and add the remaining cumene hydroperoxide. Hold for monomer conversion until 53–55% solids are reached.

*Final characteristics of the interpolymer*

| | Ex. 4 | Ex. 5 |
|---|---|---|
| Solids (percent) | 54.8 | 52.6 |
| Viscosity (Gardner) | V–W | X |
| Color (Gardner) | 2 | 2–3 |

*Note 2.*—The unsaturated epoxy ester is the reaction product of 820 parts of unsaturated epoxy resin and 547 parts of tall oil fatty acids. The ester is diluted to 80% solids in a mixture of aromatic hydrocarbon solvents (Note 1) and has a viscosity (Gardner) of $Z_3$, color (Gardner) of 6–7, and an acid value (non-volatile) of 8.6.

*Note 3.*—The unsaturated polyester resin is the reaction product of 790 parts of dehydrated castor oil fatty acid, 250 parts of crotonic acid, 785 parts of glycerine and 400 parts of isophthalic acid modified with 240 parts of a technical grade of 1,1′-isopropylidenebis (p-phenyleneoxy) di-2-propanol, 160 parts of phthalic anhydride and 255 parts of azelaic acid. The final product is diluted to 80% solids in n-butanol, has an acid value (non-volatile) of 13–15, viscosity (Gardner) V–W and color (Gardner) 3–4.

*Evaluation of acrylamide interpolymer in gloss coil coatings*

The composition of the gloss enamel evaluated consists of 28% titanium dioxide and 32% non-volatile resin of Example 4.

The film is applied using a #38 wire wound rod on 0.024″ phosphate-treated aluminum and cured for 90 seconds at 475° F. The coating has the following properties:

| | |
|---|---|
| Gloss (60°) | 84. |
| Pencil hardness | HB. |
| Reverse impact | Pass 45 inch/lbs. |
| 60 seconds toluol resistance | Insoluble. |
| Adhesion | Very good. |
| 2 T bend | Good. |
| Chill bump | Pass 40 inch/lbs. |

As the above results indicate, the coatings prepared utilizing unsaturated epoxy esters have extremely good flexibility, impact and adhesion properties.

*Evaluation of acrylamide interpolymer in appliance enamel*

The resin of Example 5 is utilized in a white appliance enamel formulation containing 28% titanium dioxide and 32% of non-volatile resin. It is ground in pepple mill to obtain a 7½ North Standard grind gauge reading. The enamel is drawn on chromate-treated steel panels and baked for 15 minutes at 350° F. The following results are obtained:

| | |
|---|---|
| Adhesion to metal | Excellent. |
| Pencil hardness | 2H. |
| Forward impact (inch/lbs.) | 80. |
| Reverse impact (inch/lbs.) | 50. |
| Flexibility (conical mandrel) | Pass ⅛″. |
| Gloss (60° F.) | 91. |
| Toluol resistance | Very good. |
| Recoat adhesion | Very good. |

As the above results illustrate, coatings prepared utilizing the epoxy ester-modified acrylamide interpolymers of the invention provide a highly desirable combination of hardness, good flexibility and impact resistance and possess excellent solvent resistance.

EXAMPLE 6

Examples 1–5 are repeated to provide coating solution in which 25% of the resin solids used in these examples is replaced with a corresponding weight of the following resin solutions:

(1) A benzoguanamine-formaldehyde resin which is a condensation product of 4 mols of the formaldehyde with 1 mol of benzoguanamine in the presence of excess butanol and an acid catalyst to provide a heat-hardenable resin etherified with butanol to provide solvent solubility. The resin is utilized as a 60% resin solids solution of benzoguanamine-formaldehyde resin in a 50/50 weight ratio mixture of butanol/xylol.

(2) A butylated melamine-formaldehyde resin which is a condensation product of 5.5 mols of formaldehyde with 1 mol of melamine in the presence of excess butanol and formic acid catalyst to provide a solvent-soluble heat-hardening resin. The melamine-formaldehyde resin is used in the form of a 50% solids solution in 40/10 butanol/xylol solvent mixture which exhibits the following physical characteristics:

Viscosity _____ 320 centipoises.
Mineral spirits tolerance _____ 9.5/1. (95 cc./10 grams).
Acid number _____ Less than 1.0.

(3) A butylated urea-formaldehyde resin which is a condensation product of 2.2 mols of formaldehyde with 1 mol of urea in the presence of excess butanol and oxalic acid catalyst to provide a solvent-soluble heat-hardening resin. The urea-formaldehyde resin is used in the form of a 54% solids solution in 40/10 butanol/xylol solvent mixture which exhibits the following physical characteristics:

Viscosity _____ 460 centipoises.
Mineral spirits tolerance _____ 25 cc./10 grams resin.

(4) Methyl ether of hexamethylol melamine.
(5) A vinyl chloride-vinyl acetate copolymer containing 91% vinyl chloride, 3% vinyl acetate and 6% vinyl alcohol and having an intrinsic viscosity in 1% cyclohexanone at 20° C. of 0.57.

In each instance, an improved cure is noted by the achievement of insoluble films having increased hardness.

EXAMPLE 7

Examples 4 and 5 are repeated replacing the tall oil fatty acids of these examples with an equal weight of (1) linseed oil fatty acids; (2) coconut oil fatty acids; and (3) dehydrated castor oil fatty acids in the formation of the epoxy ester. Similar results to those reported in Examples 4 and 5 are obtained in each instance.

As will now be apparent, the inclusion of ethylenically unsaturated epoxy resin and especially fatty acid esters thereof into acrylamide interpolymers produces coatings which cure readily to provide films of increased hardness, flexibility, impact resistance and adhesion to metal. The other desirable characteristics of the interpolymer, such as solvent resistance, intercoat adhesion and gloss, are not detrimentally affected by the inclusion of the ethylenically unsaturated epoxy resin, or the fatty acid esters thereof and, in some instances, these other desirable characteristics are themselves improved.

The invention is defined in the claims which follow:
I claim:

1. A solvent-soluble, heat-hardening, non-gelled interpolymer of interpolymerized components comprising: (A) from 2–45% by weight of an amide of an ethylenically unsaturated carboxylic acid; and (B) from 2–50% by weight of ethylenically unsaturated epoxy polyolefin fatty acid ester copolymerizable with said amide; said percentages being based on the total weight of unsaturated polymerizable material and said interpolymer having amido hydrogen atoms replaced by the structure:

in which R is selected from the group consisting of hydrogen, furyl, and aromatic and saturated lower aliphatic hydrocarbon radicals containing up to 10 carbon atoms, and $R_1$ is selected from the group consisting of hydrogen and the etherification residue of aliphatic alcohol containing up to 10 carbon atoms.

2. An interpolymer as recited in claim 1 in which said amide is an acrylamide and said interpolymer further includes monoethylenically unsaturated monomer having the $CH_2=C<$ group.

3. An interpolymer as recited in claim 2 in which the amido groups are reacted with formaldehyde.

4. An interpolymer as recited in claim 2 in which said unsaturated epoxy polyolefin fatty acid ester is the esterification reaction product of a partially epoxidized polydiolefin and a fatty acid.

5. An interpolymer as recited in claim 4 in which said fatty acid is a drying oil fatty acid.

6. An interpolymer as recited in claim 4 in which at least 5% of the total esterifiable groups in said polydiolefin are esterified.

7. A solvent-soluble, heat-hardening, non-gelled interpolymer of interpolymerized components comprising:
(A) an acrylamide in an amount of from 2–45% by weight;
(B) monoethylenically unsaturated monomer containing the $CH_2=C<$ group; and
(C) from 2–50% by weight of ethylenically unsaturated epoxy polyolefin fatty acid ester of a long chain fatty acid containing 16–22 carbon atoms in the molecule and partially epoxidized liquid polydiolefin, said interpolymer having amido hydrogen atoms replaced by the structure —$CH_2OH$, and said percentages being based on the total weight of unsaturated polymerizable material.

8. An interpolymer as recited in claim 7 in which said long chain fatty acid is a drying oil fatty acid.

9. An interpolymer as recited in claim 7 in which said polydiolefin is a polybutadiene partially epoxidized to provide an epoxide equivalent weight in the range of from 100–300 and an iodine number of at least 100.

10. An interpolymer as recited in claim 9 in which said ester of partially epoxidized polybutadiene is present in an amount of from 3–25% on said weight basis.

11. An interpolymer as recited in claim 7 in which said epoxy polyolefin is partially esterified with said fatty acid, the equivalent ratio of fatty acid carboxyl group to epoxy oxirane group being from 0.2:1 to 1:1.

12. A heat-hardenable resinous composition comprising an organic solvent solution having dissolved therein a non-gelled interpolymer of interpolymerized components comprising: (A) from 2–45% by weight of an amide of an ethylenically unsaturated carboxylic acid; and (B) from 2–50% by weight of ethylenically unsaturated epoxy polyolefin fatty acid ester copolymerizable with said amide; said percentages being based on the total weight of unsaturated polymerizable material and said interpolymer having amido hydrogen atoms replaced by the structure:

in which R is selected from the group consisting of hydrogen, furyl, and aromatic and saturated lower aliphatic hydrocarbon radicals containing up to 10 carbon atoms, and $R_1$ is selected from the group consisting of hydrogen and the etherification residue of aliphatic alcohol containing up to 10 carbon atoms.

13. An article having a metal surface to which is adhered a heat-hardened coating of the resinous composition of claim 12.

References Cited by the Examiner

UNITED STATES PATENTS

| | | | |
|---|---|---|---|
| 2,870,117 | 1/1959 | Vogel et al. | 260—72 |
| 3,010,976 | 11/1961 | Greenspan et al. | 260—23.7 |
| 3,037,963 | 6/1962 | Christenson | 260—23 |
| 3,058,947 | 10/1962 | Fryling et al. | 260—45.2 |

LEON J. BERCOVITZ, *Primary Examiner.*